United States Patent [19]
Kerschner

[11] Patent Number: 6,070,480
[45] Date of Patent: *Jun. 6, 2000

[54] DIFFERENTIAL MOTOR DRIVE FOR AN XY STAGE

[75] Inventor: Ronald K. Kerschner, Loveland, Colo.

[73] Assignee: Hewlett Packard Company, Palo Alto, Calif.

[*] Notice: This patent is subject to a terminal disclaimer.

[21] Appl. No.: 09/169,264

[22] Filed: Oct. 9, 1998

[51] Int. Cl.[7] ................................................ F16H 27/02
[52] U.S. Cl. ............................................ 74/89.2; 74/89.22
[58] Field of Search ................................ 74/89.2, 89.22, 74/89.21

[56] References Cited

U.S. PATENT DOCUMENTS

| | | | |
|---|---|---|---|
| 2,675,291 | 4/1954 | Webster | 346/29 |
| 2,785,941 | 3/1957 | Macklem et al. | 346/8 |
| 3,529,481 | 9/1970 | Budzyn | 74/89.21 |
| 3,926,061 | 12/1975 | Paulson . | |
| 4,315,437 | 2/1982 | Echeparre et al. | 74/89.22 |
| 5,198,736 | 3/1993 | Azuma et al. | 74/89.22 |
| 5,357,366 | 10/1994 | Marchlenski . | |
| 5,504,407 | 4/1996 | Wakui et al. . | |
| 5,561,299 | 10/1996 | Ishida et al. . | |

*Primary Examiner*—David A. Bucci
*Assistant Examiner*—William C Joyce
*Attorney, Agent, or Firm*—Steven L. Webb

[57] ABSTRACT

A differential motor drive for an XY stage comprising a fixed base and two moveable platforms where the platforms' movements are orthogonal with respect to each other. Both motors for the X and the Y stages are located on the fixed base and do not move with either of the moving platforms. As the motors rotate at substantially the same speed in substantially opposite directions only the Y stage moves. As the motors rotate at substantially the same speed in substantially the same direction only the X stage moves. As the motors rotate at different speeds in either the same or opposite directions, both the X and Y stages move.

11 Claims, 3 Drawing Sheets

DIFFERENTIAL MOTOR DRIVE FOR AN XY STAGE

FIELD OF THE INVENTION

This invention relates generally to printed circuit board test systems and more specifically to a differential motor drive for an XY stage that positions the printed circuit board to be tested.

BACKGROUND OF THE INVENTION

X-ray inspection systems provide precise and fast analysis of solder integrity on loaded printed circuit boards. These X-ray systems typically have a fixed X-ray source and detection means. The printed circuit board (PC board) to be tested is typically mounted in an XY stage, such that the PC board can be moved in the X and Y direction underneath the fixed X-ray source. This allows the PC board to be completely scanned, by the X-ray source, over the PC board's area. Typically the XY stages are motor driven so that the scanning of the PC board can be done under the control of a computer.

A typical XY stage consists of a base and two movable platforms, where the movement of the two platforms is restrained to be in orthogonal directions. There are a number of known methods to restrain the platform's movement. Typically a rod and bearing mounting system is used. Other methods are available. For example, a platform could be mounted on wires or belts that move around pulleys. Or there could be grooves or tracks that a platform slides along. The platforms also typically have a means to move the platforms along their respective orthogonal directions. Some examples are a drive screw, a belt and pulley system, or a gear and track system. Some XY systems combine the orthogonal restricting means and the movement or drive means. For example, an X or Y stage that is suspended from and moved by a cable or belt routed around a number of pulleys combines the moving means and the mechanism that restricts the motion of the X or Y stage.

A conventional XY stage is shown in FIG. 1 and generally consists of a base 102, an Y stage 124, and an X stage 104. The Y stage 124 is mounted on a first pair of rods 114 and is driven along the rods 114 by a first belt 120 attached to the Y stage by clamp 126. The belt 120 is driven by a first motor 116 mounted to the X stage 104.

The X stage 104 is mounted on a second pair of rods 106 that are substantially perpendicular to rods 114. The X stage is driven along the rods 106 by a second belt 110, attached to the X stage by a clamp 112. A second motor 108, mounted to the base 102, drives belt 110. Because the first motor 116 that drives the Y stage 124 is mounted on the X stage 104, the second motor 108 must move the mass of the first motor when it moves the X stage 104. This weight or mass of the first motor 116 increases the minimum size of the second motor 108 by increasing the amount of mass the second motor 108 is required to move. The stiffness of the drive mechanism is also a function of the mass of the system. The higher the mass, the stiffer the drive mechanism needs to be for a desired movement in a desired time.

Another problem of having the first motor 116 mounted on the movable X stage 104 is the requirement to route power to the motor. Because the motor 116 moves back and forth as the X stage 104 moves, the power connection must be flexibly mounted from base 102 up to the X stage 104. This flexible power connection introduces wear problems that are costly to overcome.

Another problem of having the first motor 116 mounted on the movable X stage is the magnetic field (not shown) generated by the motor 116 moves as the motor 116 moves. This moving magnetic field creates problems for the X-ray beam (not shown) by changing the direction of the X-ray beam dependent on the location of the magnetic field radiating from the motor 116. This problem requires shielding to prevent the X-ray beam from moving or some other means to compensate for the movement of the X-ray beam.

Another problem with having a motor mounted on a moving stage is the difficulty in isolating the moving motor from the environment that may be required by the work piece. For example in some integrated circuit manufacturing steps the workpiece (the silicon wafer) must be kept extremely clean. Maintaining this type of environment with a motor moving through the environment is difficult.

SUMMARY OF THE INVENTION

A differential motor drive for an XY stage comprising a fixed base and two moveable platforms where the platforms' movements are orthogonal with respect to each other. Both motors for the X and the Y stages are located on the fixed base and do not move with either of the moving platforms. As the motors rotate at the same speed in opposite directions only the Y stage moves. As the motors rotate at the same speed in the same direction only the X stage moves. As the motors rotate at different speeds in either the same or opposite directions, both the X and Y stages move.

DETAILED DESCRIPTION OF THE PREFERRED EMBODIMENT

This invention is a differential motor drive for an XY stage comprising a fixed base and two moveable platforms where the platforms' movements are orthogonal with respect to each other. Both motors for the X and the Y stages are located on the fixed base and do not move with either of the moving platforms.

Because both motors are mounted on the fixed base, the moving platform that comprises the X stage has a smaller mass than a comparable X stages from the prior art. This reduction in the mass of one of the moving platforms has a number of advantages. A smaller motor can be used to drive the lighter stage. Smaller motors are typically cheaper than larger motors, and smaller motors typically use less energy than larger motors. Therefore this invention would make the XY stage cheaper to build and cheaper to operate.

Having both motors in a fixed non-moving location allows the power connections for the motors to be fixed and non-moving. This removes the requirement for a flexible power connection to one of the motors. The fixed location of both motors also eliminates the moving magnetic field problem encountered in the previous XY stage designs. The fixed location of both motors allows both motors to be more easily isolated from the environment in which the XY stage is operating.

Figure 1:
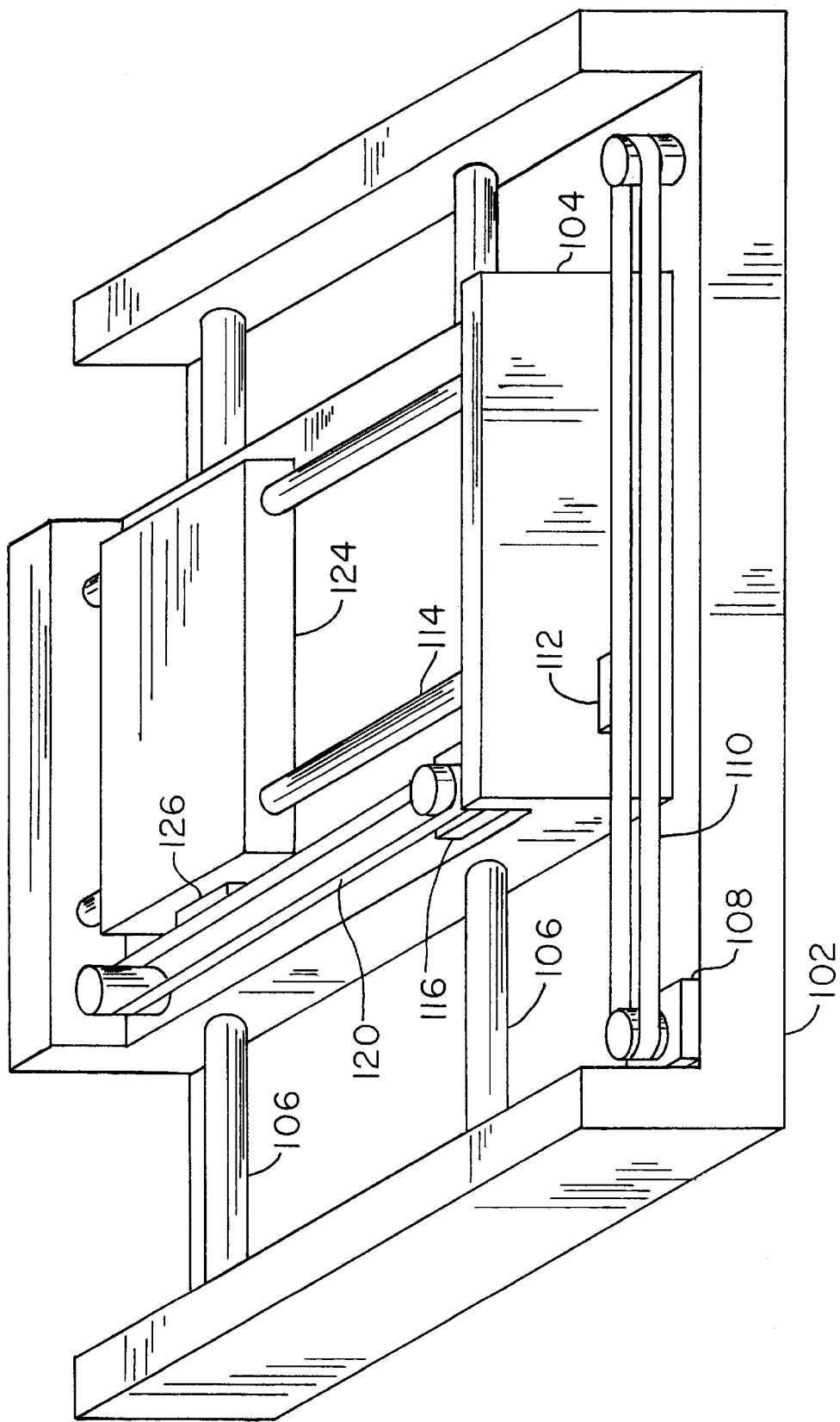
FIG. 1 is a perspective view of a prior art XY stage.
Figure 2:
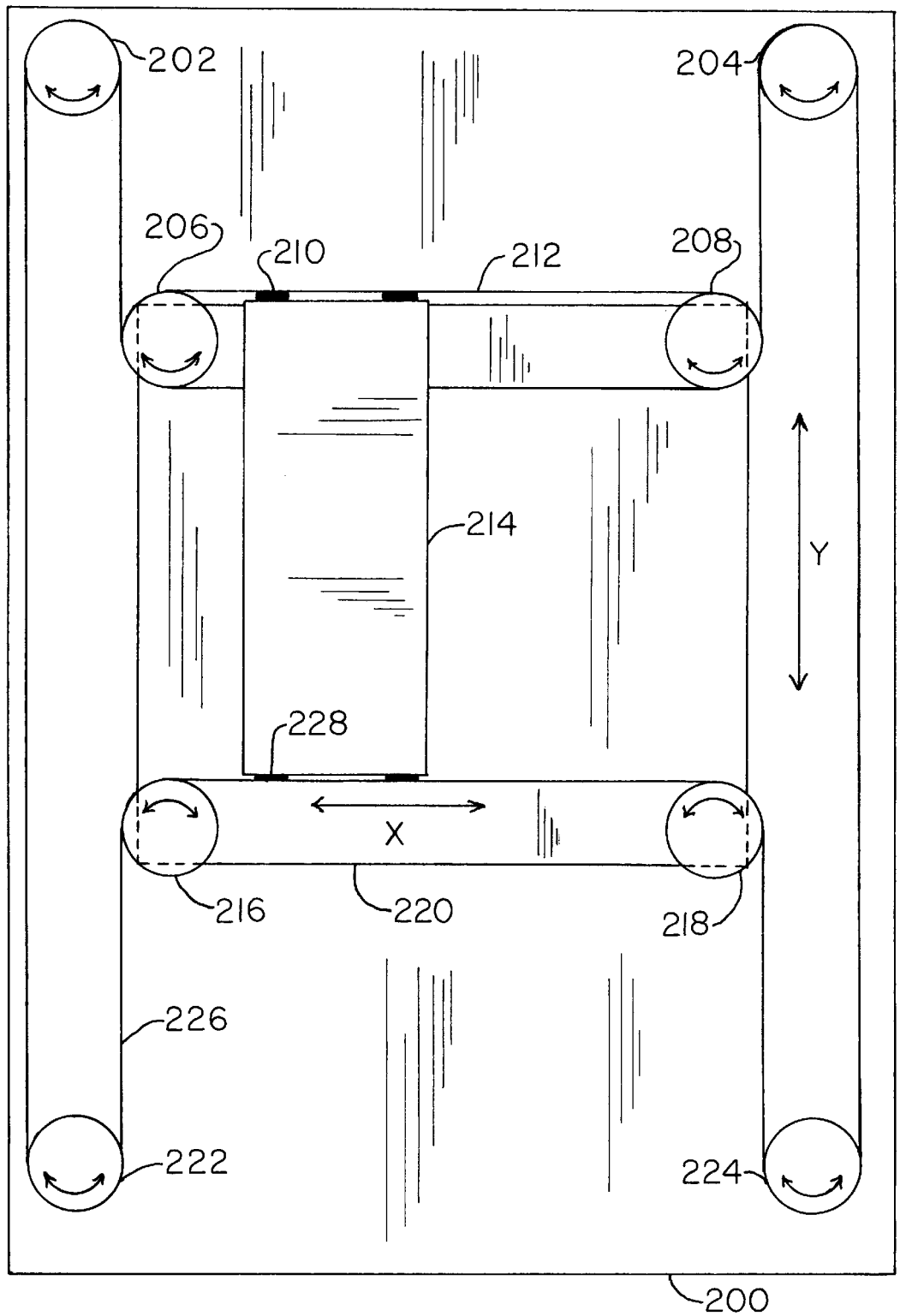
FIG. 2 is a top view of the differential motor drive XY stage according to the present invention.
Figure 3:
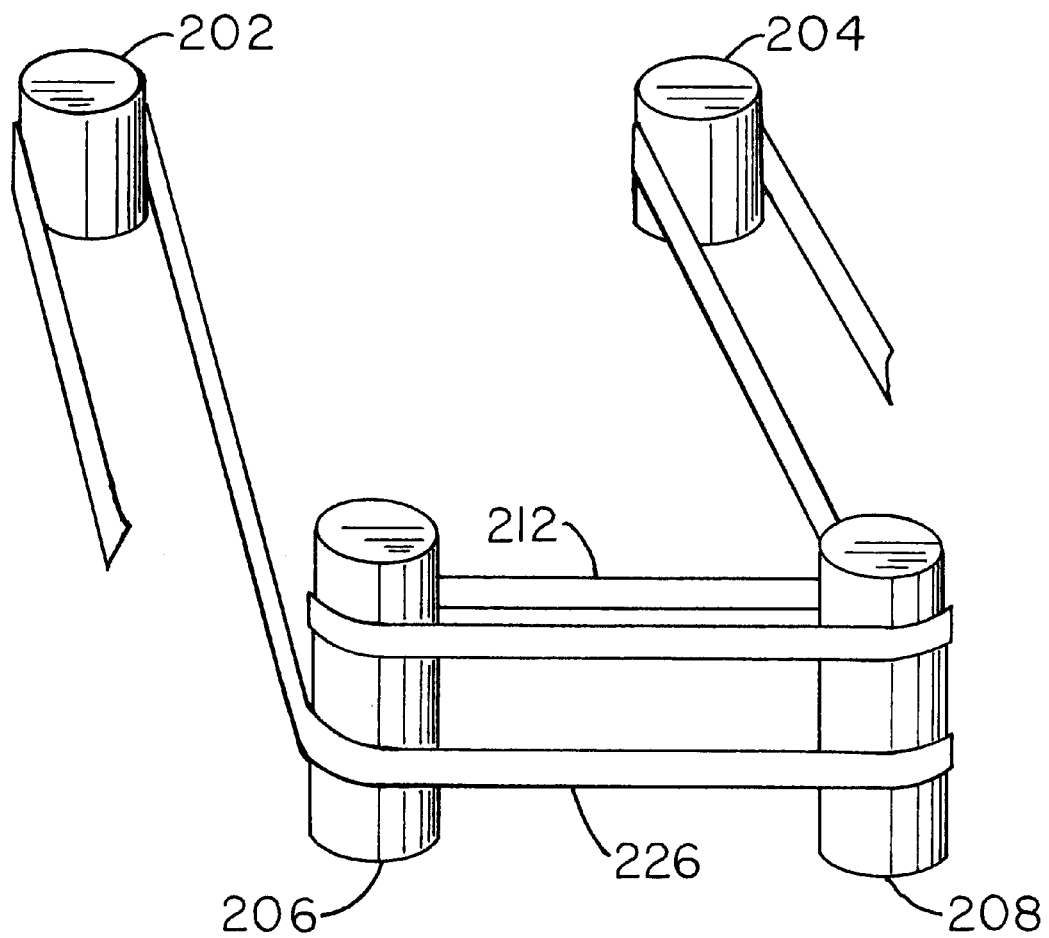
FIG. 3 is a perspective view of the secondary belt routing according to the present invention.

FIG. 2 shows the differential drive system for an XY stage comprising a fixed base 200, with two movable platforms according to the present invention. The platforms' movements are constrained to be in orthogonal directions typically called the X and Y directions. The first movable platform 214 or the X stage platform is attached to the main flexible drive member 226 with clamp 228. A flexible drive member can be a belt, a cable or their equivalent. In the preferred embodiment the flexible drive member is a belt. The X stage platform 214 is also attached to a secondary belt 212 with clamp 210. The main belt 226 is routed around pulley 216, then to a first motor 222, then to pulley 202, then around pulley 206, then to pulley 208, then around pulley 204, then to a second motor 224, then to pulley 218 and finally back to pulley 216. Pulleys 216, 206, 208, and 218 are mounted in the four corners of the second movable platform 220 or Y stage platform. Pulleys 202 and 204 are mounted on the fixed base 200. The first motor 222 and the second motor 224 are also mounted on the fixed base 200. The secondary belt 212 is routed around pulley 206 and pulley 208 as shown in FIG. 3. When the first motor 222 and the second motor 224 rotate at the same speed in opposite directions (for example, clockwise and counter clockwise) the Y stage platform 220 and everything mounted on it translates in the Y direction. When the first motor 222 and the second motor 224 rotate at the same speed in the same direction (for example, both motors rotate clockwise) the X stage platform is moved in the X direction. As the motors rotate at different speed in either the same or opposite directions, both the X and Y stages move in both the X and Y directions.

In the preferred embodiment motor 222 and motor 224 have substantially equal diameter drive pulleys (not shown) such that when both motors move an equal angular displacement the part of the flexible drive member, contacting each motor drive pulley, moves substantially the same linear amount. It is possible to have different sized drive pulleys on the two motors but this increases the complexity of the control system for the XY stage.

Because both motors are used to move either of the X or Y stages, the motors share the load of moving each stage.

When the X stage platform 214 is mounted on a rod and bearing system (not shown) or some other means that restrains the motion in the X direction then the secondary belt 212 is not required.

What is claimed is:

1. A differential motor drive for an XY stage comprising:
a fixed base with a first surface and with a first edge and a second edge opposite the first edge;
a first motor having an axis of rotation, said first motor being mounted to the fixed base on the first surface along the first edge;
a second motor having an axis of rotation, said second motor being mounted to the fixed base on the first surface along the first edge so that said second motor is located a spaced distance from said first motor;
a first pulley having an axis of rotation, said first pulley being mounted on the first surface along the second edge of said fixed base;
a second pulley having an axis of rotation, said second pulley being mounted on the first surface along the second edge of said fixed base so that said second pulley is located a spaced distance from said first pulley, wherein said first and second motors and said first and second pulleys form a rectangular configuration and wherein said first pulley is opposite said first motor and the axis of rotation of said first and second motors and said first and second pulleys are parallel;
a first moveable platform, with a first edge and a second edge opposite the first edge, said first moveable platform moveably mounted to said fixed base between said first and second motors so that the first edge of said first moveable platform is substantially parallel and adjacent the first edge of said fixed base;
a third pulley having an axis of rotation, said third pulley being mounted along the first edge of said first moveable platform;
a fourth pulley having an axis of rotation, said fourth pulley being mounted along the first edge of said first moveable platform so that said fourth pulley is located a spaced distance from said third pulley, and so that said third pulley is closest to said first motor;
a fifth pulley having an axis of rotation, said fifth pulley being mounted along the second edge of said first moveable platform;
a sixth pulley having an axis of rotation, said sixth pulley being mounted along the second edge of said first moveable platform, wherein said third, fourth, fifth, and sixth pulleys form a rectangular configuration with said fifth pulley being located opposite said third pulley, and wherein the axes of rotation of said third, fourth, fifth, and sixth pulleys are substantially parallel to the axes of rotation of said first and second motors and said first and second pulleys;
a first belt routed from said first motor to said third pulley and then to said fourth pulley and then to said second motor and then to said second pulley and then to said sixth pulley and then to said fifth pulley and then to said first pulley and then back to said first motor;
a second moveable platform moveably mounted to said first moveable platform, wherein the second moveable platform is attached to said first belt between said third and fourth pulleys so that when said first and second motors rotate in the same direction said first moveable platform remains substantially stationary and said second moveable platform translates substantially parallel to the first edge of said fixed base;
a secondary flexible drive member forming a loop from the fifth pulley around the sixth pulley, and where the second moveable platform is attached to the secondary flexible drive member between the fifth and sixth pulleys on the side of the loop closest to the second edge of the first moveable platform.

2. A differential motor drive for an XY stage comprising:
a fixed base with a first surface and with a first edge and a second edge opposite the first edge;
a first motor having an axis of rotation, said first motor being mounted to the fixed base on the first surface along the first edge;
a second motor having an axis of rotation, said second motor being mounted to the fixed base on the first surface along the first edge so that said second motor is located a spaced distance from said first motor;
a first pulley having an axis of rotation, said first pulley being mounted on the first surface along the second edge of said fixed base;
a second pulley having an axis of rotation, said second pulley being mounted on the first surface along the second edge of said fixed base so that said second pulley is located a spaced distance from said first pulley, wherein said first and second motors and said first and second pulleys form a rectangular configuration and wherein said first pulley is opposite said first motor and the axis of rotation of said first and second motors and said first and second pulleys are parallel;
a first moveable platform, with a first edge and a second edge opposite the first edge, said first moveable platform moveably mounted to said fixed base between said first and second motors so that the first edge of said first moveable platform is substantially parallel and adjacent the first edge of said fixed base;

a third pulley having an axis of rotation, said third pulley being mounted along the first edge of said first moveable platform;

a fourth pulley having an axis of rotation, said fourth pulley being mounted along the first edge of said first moveable platform so that said fourth pulley is located a spaced distance from said third pulley, and so that said third pulley is closest to said first motor;

a fifth pulley having an axis of rotation, said fifth pulley being mounted along the second edge of said first moveable platform;

a sixth pulley having an axis of rotation, said sixth pulley being mounted along the second edge of said first moveable platform, wherein said third, fourth, fifth, and sixth pulleys form a rectangular configuration with said fifth pulley being located opposite said third pulley, and wherein the axes of rotation of said third, fourth, fifth, and sixth pulleys are substantially parallel to the axes of rotation of said first and second motors and said first and second pulleys;

a first cable routed from said first motor to said third pulley and then to said fourth pulley and then to said second motor and then to said second pulley and then to said sixth pulley and then to said fifth pulley and then to said first pulley and then back to said first motor;

a second moveable platform moveably mounted to said first moveable platform, wherein the second moveable platform is attached to said first cable between said third and fourth pulleys so that when said first and second motors rotate in the same direction said first moveable platform remains substantially stationary and said second moveable platform translates substantially parallel to the first edge of said fixed base;

a secondary flexible drive member forming a loop from the fifth pulley around the sixth pulley, and where the second moveable platform is attached to the secondary flexible drive member between the fifth and sixth pulleys on the side of the loop closest to the second edge of the first moveable platform.

3. A differential motor drive for an XY stage comprising:

a fixed base with a first surface and with a first edge and a second edge opposite the first edge;

a first motor having an axis of rotation, said first motor being mounted to the fixed base on the first surface along the first edge;

a second motor having an axis of rotation, said second motor being mounted to the fixed base on the first surface along the first edge so that said second motor is located a spaced distance from said first motor;

a first pulley having an axis of rotation, said first pulley being mounted on the first surface along the second edge of said fixed base;

a second pulley having an axis of rotation, said second pulley being mounted on the first surface along the second edge of said fixed base so that said second pulley is located a spaced distance from said first pulley, wherein said first and second motors and said first and second pulleys form a rectangular configuration and wherein said first pulley is opposite said first motor and the axis of rotation of said first and second motors and said first and second pulleys are parallel;

a first moveable platform, with a first edge and a second edge opposite the first edge, said first moveable platform moveably mounted to said fixed base between said first and second motors so that the first edge of said first moveable platform is substantially parallel and adjacent the first edge of said fixed base;

a third pulley having an axis of rotation, said third pulley being mounted along the first edge of said first moveable platform;

a fourth pulley having an axis of rotation, said fourth pulley being mounted along the first edge of said first moveable platform so that said fourth pulley is located a spaced distance from said third pulley, and so that said third pulley is closest to said first motor;

a fifth pulley having an axis of rotation, said fifth pulley being mounted along the second edge of said first moveable platform;

a sixth pulley having an axis of rotation, said sixth pulley being mounted along the second edge of said first moveable platform, wherein said third, fourth, fifth, and sixth pulleys form a rectangular configuration with said fifth pulley being located opposite said third pulley, and wherein the axes of rotation of said third, fourth, fifth, and sixth pulleys are substantially parallel to the axes of rotation of said first and second motors and said first and second pulleys;

a first chain routed from said first motor to said third pulley and then to said fourth pulley and then to said second motor and then to said second pulley and then to said sixth pulley and then to said fifth pulley and then to said first pulley and then back to said first motor;

a second moveable platform moveably mounted to said first moveable platform, wherein the second moveable platform is attached to said first chain between said third and fourth pulleys so that when said first and second motors rotate in the same direction said first moveable platform remains substantially stationary and said second moveable platform translates substantially parallel to the first edge of said fixed base;

a secondary flexible drive member forming a loop from the fifth pulley around the sixth pulley, and where the second moveable platform is attached to the secondary flexible drive member between the fifth and sixth pulleys on the side of the loop closest to the second edge of the first moveable platform.

4. A differential motor drive for an X-Y stage, comprising:

a base;

a first driving pulley mounted to said base;

a second driving pulley mounted to said base;

a first freewheeling pulley mounted to said base;

a second freewheeling pulley mounted to said base so that said first driving pulley, said second driving pulley, said first freewheeling pulley and said second freewheeling pulley define a substantially rectangular configuration;

a first moveable platform moveably mounted with respect to said base so that said moveable platform is moveable along a first axis;

a third freewheeling pulley mounted to said first moveable platform;

a fourth freewheeling pulley mounted to said first moveable platform;

a fifth freewheeling pulley mounted to said first moveable platform;

a sixth freewheeling pulley mounted to said first moveable platform so that said third, fourth, fifth, and sixth freewheeling pulleys define a substantially rectangular configuration;

a first flexible drive member operatively engaged with said first and second driving pulleys and said first, second, third, fourth, fifth, and sixth freewheeling pulleys;

a second flexible drive member operatively engaged with said fifth and sixth freewheeling pulleys so that said second flexible drive member forms an endless loop around said fifth and sixth freewheeling pulleys;

a second moveable platform secured to said first flexible drive member at a point between said third and fourth freewheeling pulleys and secured to said second flexible drive member at a point between said fifth and sixth freewheeling pulleys, said second moveable platform being moveable with respect to said first moveable platform along a second axis, said second axis being substantially perpendicular to said first axis, wherein said first moveable platform moves along said first axis and said second platform does not move along said second axis when said first and second driving pulleys rotate in opposite directions and wherein said second moveable platform moves along said second axis and said first moveable platform does not move along said first axis when said first and second driving pulleys rotate in the same direction.

5. The differential motor drive of claim 4, wherein said first freewheeling pulley is located opposite said first driving pulley and wherein said second freewheeling pulley is located opposite said second driving pulley.

6. The differential motor drive of claim 5, wherein said fifth freewheeling pulley on said first moveable platform is located substantially opposite said third freewheeling pulley and wherein said sixth freewheeling pulley on said first moveable platform is located substantially opposite said fourth freewheeling pulley.

7. The differential motor drive of claim 6, wherein said first flexible drive member is routed around said first driving pulley on said base, thence around said third freewheeling pulley on said first moveable platform, thence around said fourth freewheeling pulley on said first moveable platform, thence around said second driving pulley on said base, thence around said second freewheeling pulley on said base, thence around said sixth freewheeling pulley on said first moveable platform, thence around said fifth freewheeling pulley on said first moveable platform, thence around said first freewheeling pulley on said base, and then back to said first driving pulley on said base.

8. The differential motor drive of claim 4, wherein said first driving pulley includes a first drive motor and wherein said second driving pulley includes a second drive motor.

9. The differential motor drive of claim 8, wherein said first flexible drive member comprises a belt.

10. The differential motor drive of claim 8, wherein said first flexible drive member comprises a cable.

11. The differential motor drive of claim 8, wherein said first flexible drive member comprises a chain.

* * * * *